United States Patent
Chu et al.

(10) Patent No.: US 12,451,687 B2
(45) Date of Patent: Oct. 21, 2025

(54) SEMICONDUCTOR DEVICE AND ELECTROSTATIC DISCHARGE CLAMP CIRCUIT

(71) Applicant: TAIWAN SEMICONDUCTOR MANUFACTURING COMPANY LTD., Hsinchu (TW)

(72) Inventors: Li-Wei Chu, Hsinchu (TW); Wun-Jie Lin, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 146 days.

(21) Appl. No.: 18/489,025

(22) Filed: Oct. 18, 2023

(65) Prior Publication Data
US 2025/0132558 A1    Apr. 24, 2025

(51) Int. Cl.
H02H 9/04    (2006.01)
(52) U.S. Cl.
CPC .................... H02H 9/046 (2013.01)
(58) Field of Classification Search
CPC ........................................ H02H 9/046
USPC ........................................... 361/56
See application file for complete search history.

(56) References Cited

U.S. PATENT DOCUMENTS

| | | | | |
|---|---|---|---|---|
| 7,742,265 B2* | 6/2010 | Rice | ............ | H10D 89/811 361/56 |
| 8,010,927 B2* | 8/2011 | Gauthier, Jr. | ............ | G06F 30/30 716/109 |
| 10,193,338 B2* | 1/2019 | Goyal | ............ | G06F 3/044 |
| 10,886,729 B2* | 1/2021 | Chen | ............ | H10D 84/811 |
| 11,876,089 B2* | 1/2024 | Chen | ............ | H10D 89/811 |
| 2007/0091530 A1* | 4/2007 | Chen | ............ | H02H 9/046 361/111 |
| 2009/0189643 A1* | 7/2009 | Nedalgi | ............ | G05F 3/24 326/103 |
| 2010/0296212 A1* | 11/2010 | Liang | ............ | H10D 89/819 361/56 |

(Continued)

FOREIGN PATENT DOCUMENTS

| CN | 107425514 A | * 12/2017 | ............ | H02H 9/045 |
|---|---|---|---|---|
| CN | 109585441 A | * 4/2019 | ............ | H03K 17/0822 |
| KR | 20100115120 A | * 10/2010 | ............ | G11C 5/145 |

OTHER PUBLICATIONS

Title: Power up circuit of semiconductor device; Author: Sa Doo Hwan; KR 20100115120; Entire specification and drawings. (Year: 2010).*

*Primary Examiner* — Dharti H Patel
(74) *Attorney, Agent, or Firm* — WPAT LAW; Anthony King

(57) ABSTRACT

The present disclosure provides a semiconductor device and an electrostatic discharge (ESD) clamp circuit. The semiconductor device includes a voltage divider, a cascoded inverter, and a discharge circuit. The voltage divider is electrically coupled between a power supply voltage and an output voltage of the semiconductor device. The cascoded inverter is electrically coupled to the voltage divider. The discharge circuit is electrically coupled to the cascoded inverter. The cascoded inverter is configured to turn on the discharge circuit to discharge an electrostatic discharge (ESD) current in response to an ESD event occurring on the power supply voltage or the output voltage when the semiconductor device is in an ESD mode.

20 Claims, 7 Drawing Sheets

(56) References Cited

U.S. PATENT DOCUMENTS

| | | | |
|---|---|---|---|
| 2013/0050885 A1* | 2/2013 | Chen | H02H 9/04 |
| | | | 361/56 |
| 2018/0351352 A1* | 12/2018 | Chen | H10D 89/819 |
| 2019/0097420 A1* | 3/2019 | Chen | H10D 89/819 |
| 2021/0257353 A1* | 8/2021 | Chen | H02H 9/046 |
| 2023/0009740 A1* | 1/2023 | Hung | H02H 1/0007 |
| 2024/0332958 A1* | 10/2024 | Hung | H02H 1/0007 |
| 2024/0421591 A1* | 12/2024 | Dhakad | H02H 9/046 |

* cited by examiner

SEMICONDUCTOR DEVICE AND ELECTROSTATIC DISCHARGE CLAMP CIRCUIT

BACKGROUND

The present disclosure relates to ESD (electrostatic discharge) protection, and, in particular, to a semiconductor device and an ESD clamp circuit for high voltage applications.

An ESD protection device protects electronic circuits from electrostatic discharge (ESD) events, to avoid malfunction or damage thereto. When ESD events occur, a spike voltage can be generated between an external inductive load circuit and a terminal (e.g., gate terminal) of a semiconductor device of a semiconductor wafer. The abnormally high voltage can damage the semiconductor devices of the semiconductor wafer by, for example, blowing out the gate oxide.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features can be arbitrarily increased or reduced for clarity of discussion.

DETAILED DESCRIPTION

Figure 1A:
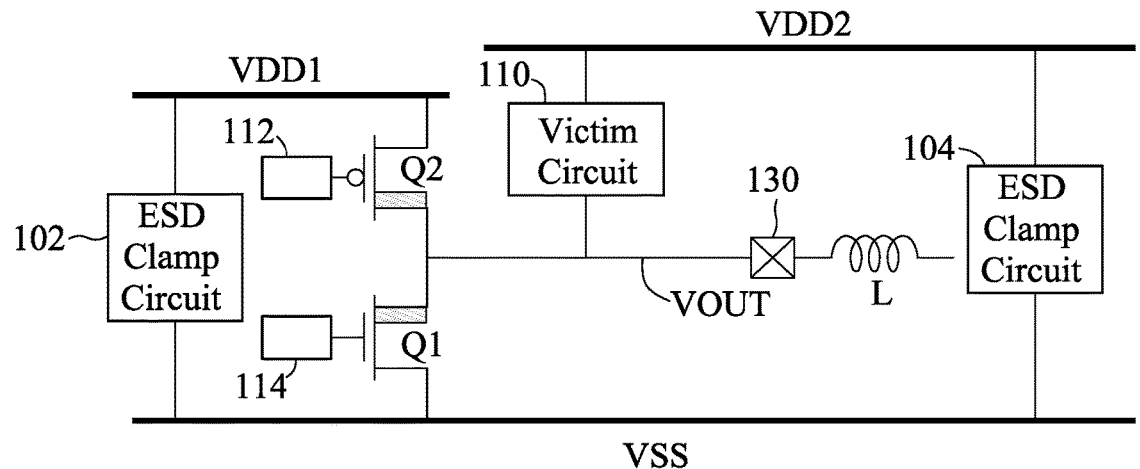
FIG. 1A is a diagram of a semiconductor device 100 in accordance with an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features can be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, it will be understood that when an element is referred to as being "connected to" or "coupled to" another element, it can be directly connected to or coupled to the other element, or intervening elements can be present.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device can be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

A clamp circuit as commonly used in ESD protection devices can be referred to as an "ESD power-rail clamp circuit" or "ESD clamp circuit." The clamp circuit may include an ESD detection circuit and a discharge device. In general, a discharge device can include relatively large transistors, with commensurately large scale in terms of channel width. A transistor of large channel width can be referred to as a "BigFET." The term "BigFET" can refer to an N-type or P-type transistor having channel width equaling or exceeding 1000 μm.

Figure 1B:
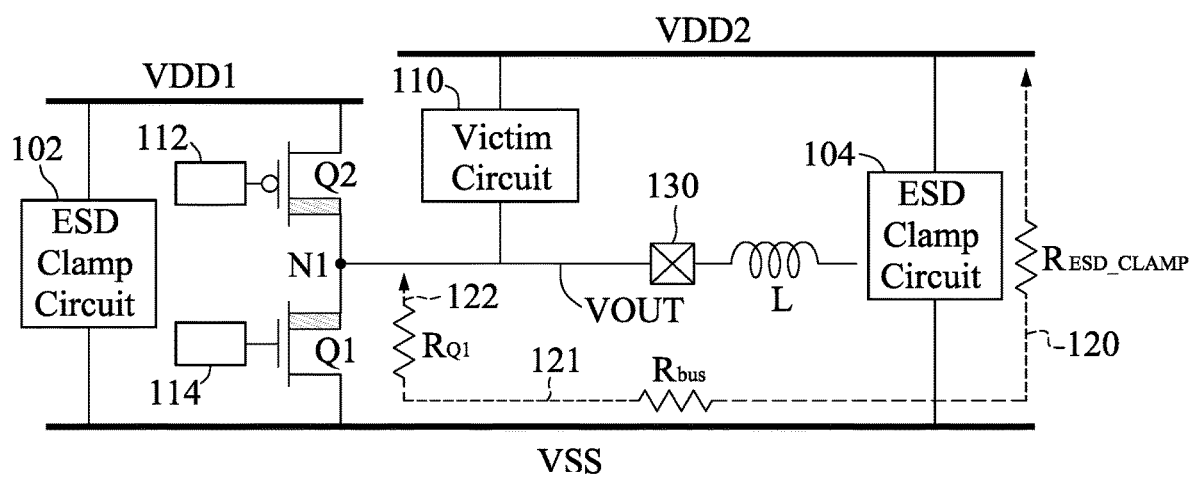
FIG. 1B is a diagram illustrating the ESD discharging path of the semiconductor device 100 in accordance with the embodiment of FIG. 1A.
Figure 2:
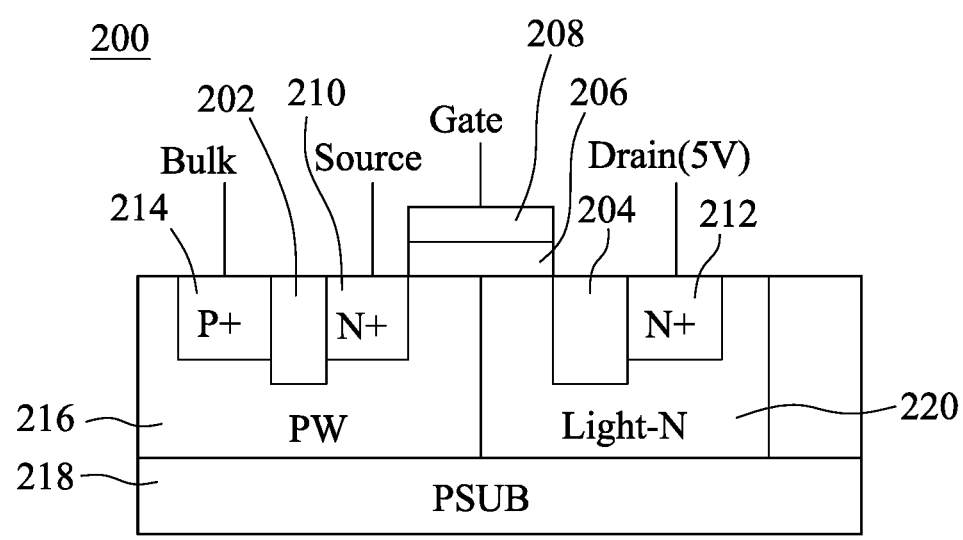
FIG. 2 is a cross section of a transistor 200 in accordance with an embodiment of the present disclosure.

FIG. 1A is a diagram of a semiconductor device 100 in accordance with an embodiment of the present disclosure. FIG. 1B is a diagram illustrating the ESD discharging path of the semiconductor device 100 in accordance with the embodiment of FIG. 1A. FIG. 2 is a cross section of a transistor 200 in accordance with an embodiment of the present disclosure. Please refer to FIGS. 1A-1B and FIG. 2.

As depicted in FIG. 1A, the semiconductor device 100 may be a CMOS (complementary metal oxide semiconductor) integrated circuit (IC) which includes ESD clamp circuits 102 and 104 that are configured to protect the victim circuit 110 (e.g., internal circuitry) from ESD events. The ESD clamp circuit 102 may be disposed between the power rail of the first power supply voltage VDD1 and that of the reference voltage VSS. The ESD clamp circuit 104 may be disposed between the power rail of the second power supply voltage VDD2 and that of the reference voltage VSS. The victim circuit 110 may be functional circuitry of the semiconductor device, and it may be coupled between the second power supply voltage VDD2 and the output voltage VOUT. The input/output (I/O) pad 130 of the output voltage VOUT may be coupled to node N1 and an inductor L. The inductor L may be configured to stabilize the current flowing to the I/O pad 130 or from the I/O pad 130, but the present disclosure is not limited thereto.

More specifically, When the semiconductor device 100 includes a mixed-voltage I/O interface with various voltage levels (e.g., VDD1-VDD2), a respective ESD clamp circuit may be disposed between the power rail of each voltage domain and that of the reference voltage VSS so as to achieve full-chip ESD protection. In some embodiments, the reference voltage VSS may be a negative voltage. In some embodiments, the reference voltage VSS may be a ground voltage (i.e., 0V).

The transistor Q1 may be coupled between node N1 and the reference voltage VSS, and it may be controlled by a voltage pull-down logic 114. The transistor Q2 may be coupled between node N1 and the first power supply voltage VDD, and it may be controlled by a voltage pull-up logic 112. Node N1 may provide the output voltage VOUT which is connected to the I/O pad 130. One having ordinary skill in the art will appreciate the operations of the voltage pull-up logic 112 and the voltage pull-down 114, and thus the details of which will be omitted here.

In some embodiments, the first power supply voltage may be 5V, but the present disclosure is not limited thereto. The voltage difference ΔV between the second power supply voltage VDD2 and the output voltage VOUT may be substantially fixed (e.g., between 1V and 2V), and the second power supply voltage VDD2 may be equal to the output voltage plus the voltage difference ΔV. Since the voltage level of the output voltage VOUT may vary, the second power supply voltage VDD2 may still follow the output voltage VOUT plus the voltage difference ΔV. It should be noted that the ESD clamp circuits 102 and 104 are coupled between the first power supply voltage VDD and the reference voltage VSS, and thus they may be not capable of protecting the victim circuit 110 from ESD events occurring on the power rail of the second power supply voltage VDD2.

Furthermore, when an ESD event occurs on the power rail of the second power supply voltage VDD2, the ESD clamp circuit 104 may be turn on to establish an ESD discharge path from the power rail of the second power supply voltage VDD2 to the I/O pad 130, and the ESD discharge path may include paths 120, 121, and 122, as depicted in FIG. 1B. For example, the path 120 may extend from the power rail of the second power supply voltage VDD2 to the power rail of the reference voltage VSS through the ESD clamp circuit 104. Since the ESD clamp circuit 104 is disposed on the path 120, so the resistance of the path 120 may be substantially equivalent to the resistance $R_{ESD\_CLAMP}$ of the ESD clamp circuit 104. The path 121 may be extend from the source terminal of the ESD clamp circuit 104 to the source terminal of the transistor Q1 on the power rail (e.g., a metal wire) of the reference voltage VSS, and the distance of the path 121 may be relatively long. Thus, the resistance $R_{bus}$ of the path 121 is considerable, and may be taken account into the overall resistance of the ESD discharge path.

The path 122 may extend from the power rail of the reference voltage VSS to the I/O pad 130 of the output voltage VOUT. Since the transistor Q1 is disposed on the path 122, so the resistance of the path 122 may be substantially equivalent to the resistance $R_{Q1}$ of the transistor Q1.

Therefore, the total resistance $R_{total}$ of the ESD discharge path can be expressed by equation (1) as follows.

$$R_{total} = R_{ESD\_Clamp} + R_{bus} + R_{Q1} \tag{1}$$

In addition, there may be respective voltage drop on each of the paths 120, 121, and 122. As a result, the total trigger voltage for activating the ESD clamp circuit 104 and the total resistance Rtotal of the ESD discharge path may be too high, and it may become more difficult to activate the ESD clamp circuit 104 in response to an ESD event. Thus, the victim circuit 110 may be damaged by an ESD event occurring on the power rail of the second power supply voltage VDD2.

Furthermore, the transistors Q1 and Q2 may be implemented using the LDMOS (laterally diffused metal oxide semiconductor) technique. The transistor Q1 may be an N-type LDMOS device, and the transistor Q2 may be a P-type LDMOS device. In addition, there is an STI region shown on the symbols of the transistors Q1 and Q2 to illustrate that the transistors Q1 and Q2 are LDMOS devices that are designed for 5V voltage applications.

FIG. 2 illustrates a cross section of the transistor 200, which may be an N-type LDMOS device. In some embodiments, a common transistor (i.e., a P-type transistor or N-type transistor) may be fabricated for lower voltage applications (e.g., 1.8V). When a higher power supply voltage (e.g., 5V or above) is used, the common transistor can be replaced by an LDMOS transistor, which is designed for higher voltage applications. The transistor 200 may be fabricated using the laterally diffused MOS (LDMOS) technique in the CMOS manufacturing process.

The substrate 218 may be or comprise a semiconductor wafer such as a silicon wafer. Alternatively, the substrate 218 may include other elementary semiconductors such as germanium. The substrate 218 may also include a compound semiconductor such as silicon carbide, gallium arsenic, indium arsenide, or indium phosphide. The substrate 218 may include an alloy semiconductor such as silicon germanium, silicon germanium carbide, gallium arsenic phosphide, or gallium indium phosphide. In present embodiment, the substrate 218 includes a P-type silicon wafer, which may be regarded as a P-type substrate. The well region 216 may be a P-type well region. The bulk terminal 214 and the source terminal 210 may be separated by a shallow trench isolation (STI) region 202.

The transistor 200 may include a gate structure disposed on the well region 216, and the gate structure may include a gate dielectric 206 and a gate electrode 128 disposed on the gate dielectric 206. The gate dielectric 206 includes a silicon dioxide layer form by thermal oxidation, chemical vapor deposition (CVD), physical vapor deposition (PVD), atomic layer deposition (ALD), or other suitable processes, or combinations thereof. Alternatively, the gate dielectric 206 may include high dielectric-constant (high-k) materials, silicon oxynitride, other suitable materials, or combinations thereof. The gate dielectric 206 may be multilayered of, for example, silicon oxide and high-k material.

The gate electrode 208 may be designed to be coupled to metal interconnects and is disposed overlying the gate dielectric 206. The gate electrode 208 may include doped polycrystalline silicon (or polysilicon). Alternatively, the gate electrode 208 may include a metal such as Al, Cu, W, Ti, Ta, TiN, TaN, NiSi, CoSi, other suitable conductive materials, or combinations thereof. The gate electrode 208 may be formed by CVD, PVD, plating, and other proper processes. The gate electrode 208 may be multilayered and formed by a multi-step process. In some embodiments, the thickness of the gate dielectric 206 may be designed for 1.8V gate voltage applications.

The well region 216 and well region 220 may be formed on the substrate 218, and the well region 216 and the well region 220 may be next to each other. The well region 216 may be a P-type well region, and the well region 220 may be a lightly doped N-type region. The well region 220 may function as a drift region for the n-channel LDMOS device. In some embodiments, the well region 220 may be part of the substrate 218 and form by implantation in absence of an epitaxial layer. The well region 220 may have an N-type dopant such as phosphorus. In some embodiments, the well region 220 may be formed by a plurality of processing steps, whether now known or to be developed, such as growing a sacrificial oxide over substrate, opening a pattern for the location of the N-well region, and implanting the impurities.

The transistor 200 may include various isolation structures such as shallow trench isolation (STI) or local oxidation of silicon (LOCOS) formed on the well region 216 or substrate 218 to define and electrically isolate various active regions. As depicted in FIG. 2, the transistor 200 may include STI region 202 and 204. For example, the STI regions 202 and 204 may include dry etching a trench in a substrate and filling the trench with insulator materials such as silicon oxide, silicon nitride, or silicon oxynitride. The filled trench may have a multi-layer structure such as a thermal oxide liner layer filled with silicon nitride or silicon oxide. In furtherance of the embodiment, the STI structure may be created using a processing sequence such as: growing a pad oxide, forming a low pressure chemical vapor deposition (LPCVD) nitride layer, patterning an STI opening using photoresist and masking, etching a trench in the substrate, optionally growing a thermal oxide trench liner to improve the trench interface, filling the trench with CVD oxide, using chemical mechanical polishing (CMP) processing to etch back and planarize, and using a nitride stripping process to remove the silicon nitride.

The doped regions 214 and 210 may be fabricated within the well region 216, and they may be separated by the STI region 202. The doped regions 214 and 210 may be electrically connected to the bulk terminal and the source terminal, respectively. In some embodiments, the doped region 214 may be a highly doped P-type region with P-type impurities (e.g., P+), such as boron. The doped region 210 may be a highly doped N-type region with N-type impurities (e.g., N+), such as phosphorous or arsenic for an n-channel LDMOS device. The STI region 202, and the doped regions 214 and 210 may be surrounded by the well region 216.

The doped region 212 may be fabricated within the well region 220, and an STI region 204 may be fabricated next to the doped region 212 to separate the doped region 212 from the channel (i.e., P-type channel between the doped region 210 and the STI region 204). The doped region 212 and the STI region may be surrounded by the well region 220. In some embodiments, the doped region 212 may be a highly doped N-type region, and it may be electrically connected to the drain terminal. The gate oxide 206 may be formed on top of the boundary between the well region 216 and the well region 220, as shown in FIG. 2. The gate electrode 208 may be formed on the gate dielectric 206, and it may be electrically connected to the gate terminal.

It should be noted that the voltage difference $|VDG|$ between the drain terminal and the gate terminal of the transistor 200 can be limited within 5V (i.e., $|VDG| \le 5V$), and the voltage difference $|VDS|$ between the drain terminal and the source terminal of the transistor 200 can also be limited within 5V (i.e., $|VDS| \le 5V$). However, due to reliability concerns, the gate dielectric 206 may be fabricated for 1.8V applications, and the voltage difference between the gate terminal and the source terminal of the transistor 200 may be limited within 1.8V.

Figure 3A:
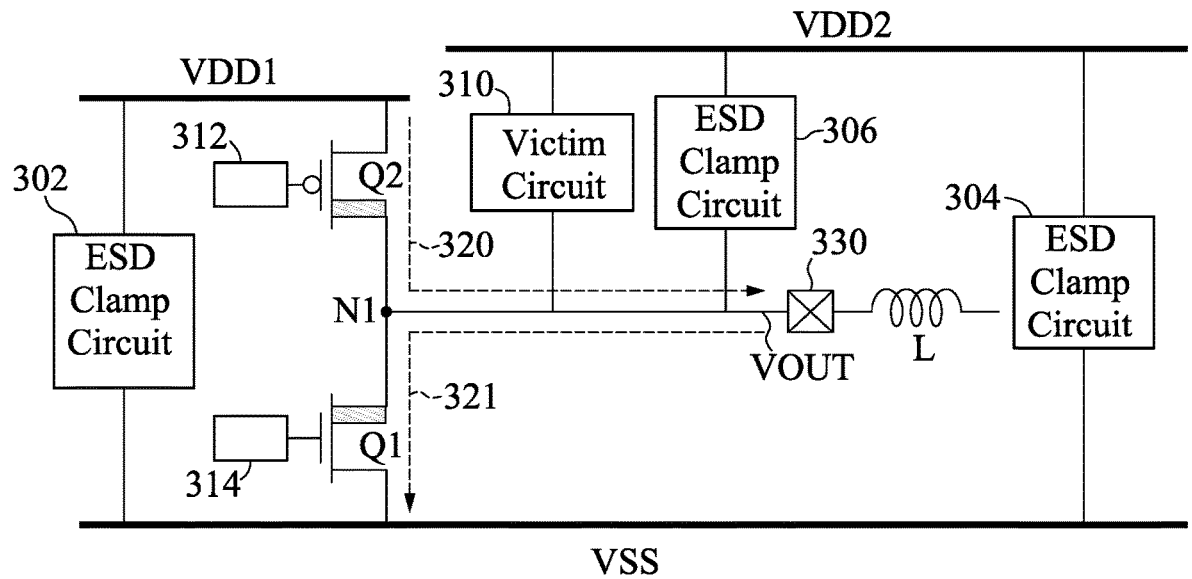
FIG. 3A is a schematic diagram of a semiconductor device 300 in accordance with another embodiment of the present disclosure.
Figure 3B:
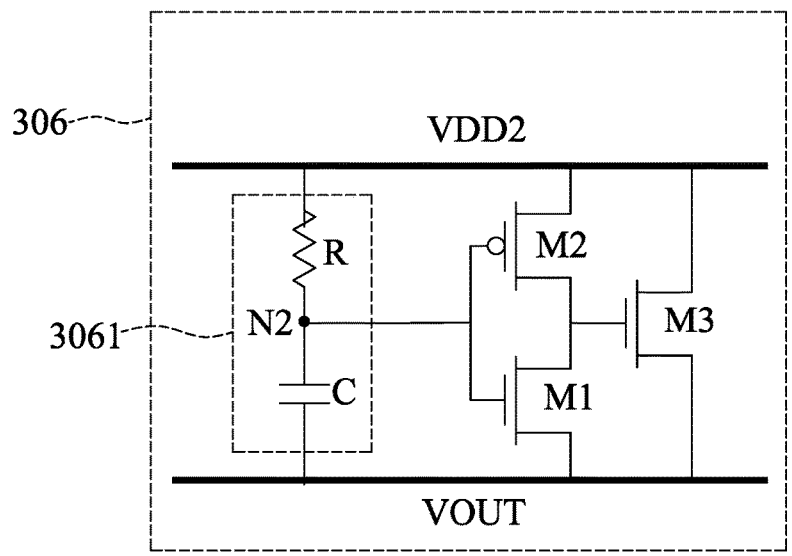
FIG. 3B is a schematic diagram of the ESD clamp circuit 306 in accordance with the embodiment of the FIG. 3A.

FIG. 3A is a schematic diagram of a semiconductor device 300 in accordance with another embodiment of the present disclosure. FIG. 3B is a schematic diagram of the ESD clamp circuit 306 in accordance with the embodiment of the FIG. 3A. Please refer to FIGS. 3A-3B.

As depicted in FIG. 3A, the semiconductor device 300 may be a CMOS (complementary metal oxide semiconductor) integrated circuit (IC) which includes ESD clamp circuits 302, 304, and 306 that are configured to protect the victim circuit 310 (e.g., internal circuitry) from ESD events. The ESD clamp circuit 302 may be disposed between the power rail of the first power supply voltage VDD1 and that of the reference voltage VSS. The ESD clamp circuit 304 may be disposed between the power rail of the second power supply voltage VDD2 and that of the reference voltage VSS. The ESD clamp circuit 304 may be disposed between the power rail of the second power supply voltage VDD2 and the output voltage VOUT.

The victim circuit 310 may be functional circuitry of the semiconductor device, and it may be coupled between the second power supply voltage VDD2 and the output voltage VOUT. The input/output (I/O) pad 330 of the output voltage VOUT may be coupled to node N1 and an inductor L. The inductor L may be configured to stabilize the current flowing to the I/O pad 330 or from the I/O pad 330, but the present disclosure is not limited thereto.

The transistor Q1 may be coupled between node N1 and the reference voltage VSS, and it may be controlled by a voltage pull-down logic 314. The transistor Q2 may be coupled between node N1 and the first power supply voltage VDD, and it may be controlled by a voltage pull-up logic 312. Node N1 may provide the output voltage VOUT which is connected to the I/O pad 330. One having ordinary skill in the art will appreciate the operations of the voltage pull-up logic 312 and the voltage pull-down 314, and thus the details of which will be omitted here.

In some embodiments, the first power supply voltage may be 5V, but the present disclosure is not limited thereto. The voltage difference $\Delta V$ between the second power supply voltage VDD2 and the output voltage VOUT may be substantially fixed (e.g., between 1V and 2V), and the second power supply voltage VDD2 may be equal to the output voltage plus the voltage difference $\Delta V$. Since the voltage level of the output voltage VOUT may vary, the second power supply voltage VDD2 may still follow the output voltage VOUT plus the voltage difference $\Delta V$. It should be noted that the ESD clamp circuits 102 and 104 are coupled between the first power supply voltage VDD and the reference voltage VSS, and thus they may be not capable of protecting the victim circuit 110 from ESD events occurring on the power rail of the second power supply voltage VDD2.

More specifically, When the semiconductor device 300 includes a mixed-voltage I/O interface with various voltage levels (e.g., VDD1-VDD2), a respective ESD clamp circuit may be disposed between the power rail of each voltage domain and that of the reference voltage VSS so as to achieve full-chip ESD protection. It should be noted that the victim circuit 310 is coupled to the second power supply voltage VDD2 and the output voltage VOUT. Since the second power supply voltage VDD2 depends on the output voltage VOUT, the ESD clamp circuit 306 is disposed therebetween to protect the victim circuit from ESD events occurring on the power rail of the second power supply voltage VDD2 or the output voltage VOUT. In some embodiments, the reference voltage VSS may be a negative voltage. In some embodiments, the reference voltage VSS may be a ground voltage (i.e., 0V).

The schematic diagram of the ESD clamp circuit 306 is illustrated in FIG. 3B. For example, the ESD clamp circuit 306 may include an RC control circuit 3061, and transistor M1~M3. In some embodiments, the transistors M1~M3 may be LDMOS devices. In addition, the transistor M3 may be a BigFET. The RC control circuit 3061 may include a resistor R and a capacitor C. The resistor R may be coupled between node N2 and the second power supply voltage VDD2. The capacitor C may be coupled between node N2 and the output voltage VOUT.

When the semiconductor device 300 is in a normal operation mode, the second power supply voltage VDD2 may be provided to node N2, and the output of the CMOS inverter (i.e., including transistors M1 and M2) may be in a low-logic state. Thus, the transistor M3 is turned off. When an ESD event occurs on the power rail of the second power supply voltage VDD2, the source of the transistor M2 may have a very high spike voltage, and the voltage level at node N2 may be kept at the second power supply voltage VDD2 by the capacitor C. At this time, since the gate voltage is lower than the source voltage of the transistor M2, the transistor M2 is turned on. Thus, the voltage level of the gate of the transistor M3 may be pulled up to the second power supply voltage VDD2, and the transistor M3 is turned on to discharge the ESD current caused by the ESD event.

In some embodiments, for electronic circuits using high voltages, such as power amplifiers or buck converters, the output terminal thereof may be driven by a large current. In addition, the inductor L may be coupled to the I/O pad 130 of the semiconductor device 300 to stabilize the current flowing to the I/O pad 130 or from the I/O pad 130.

The voltage difference ΔV caused by the current I flowing through the inductor L can be expressed by equation (2) as follows.

$$\Delta V = L \cdot \frac{dI}{dt} \quad (2)$$

Since the current flowing to the I/O pad 130 or from the I/O pad 130 may be a large current, the voltage difference ΔV caused by the current I flowing through the inductor L can also be large, resulting in high noise at the power rail of the second power supply voltage (e.g., VDD2).

More specifically, when a high noise is induced on the power rail of the second power supply voltage VDD2, the change of the second power supply voltage may be transferred to the gate of the transistor M3, and it may erroneously turn on the transistor M3 to induce a current I flowing from the power rails of the second power supply voltage VDD2 and the output voltage VOUT through the transistor M3, resulting in redundant high power loss.

Figure 4A:
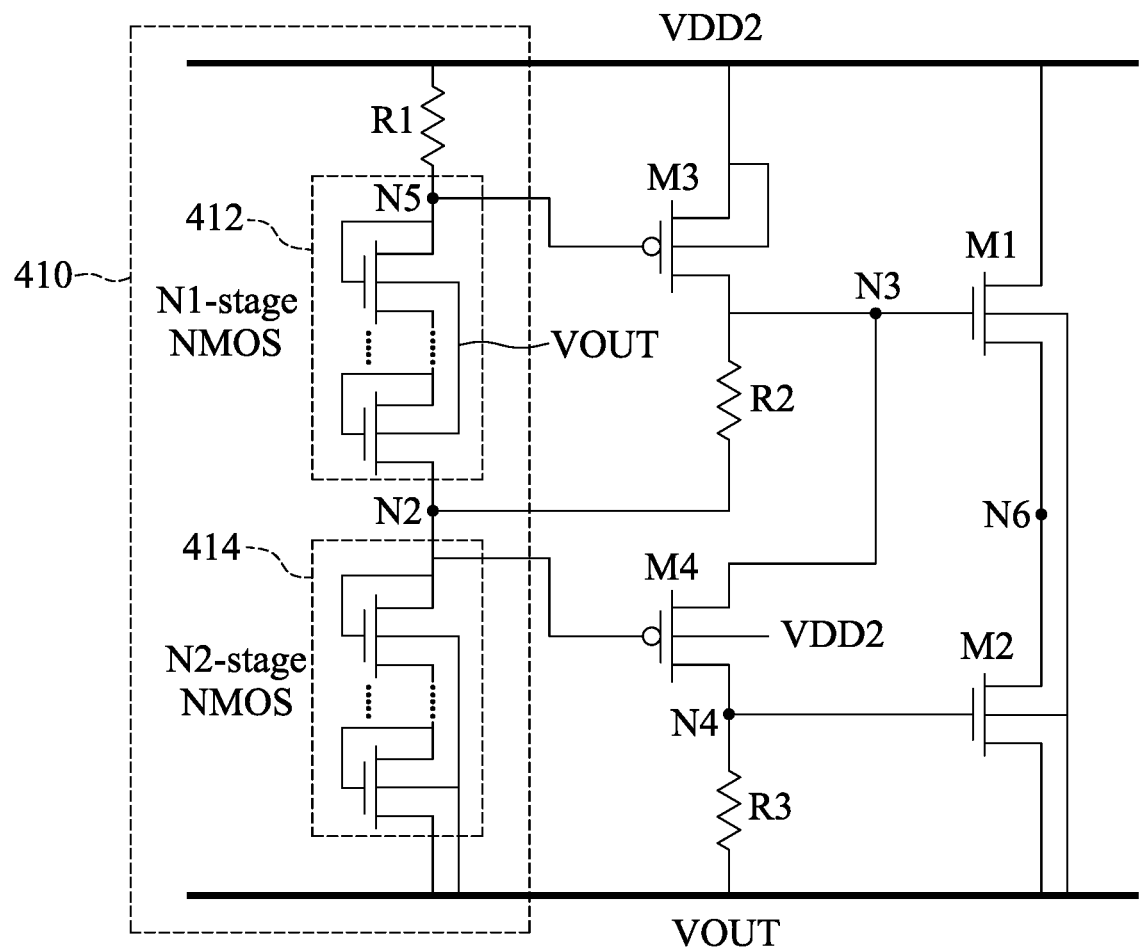
FIG. 4A is a schematic diagram of an ESD clamp circuit 400 in accordance with an embodiment of the present disclosure.
Figure 4B:
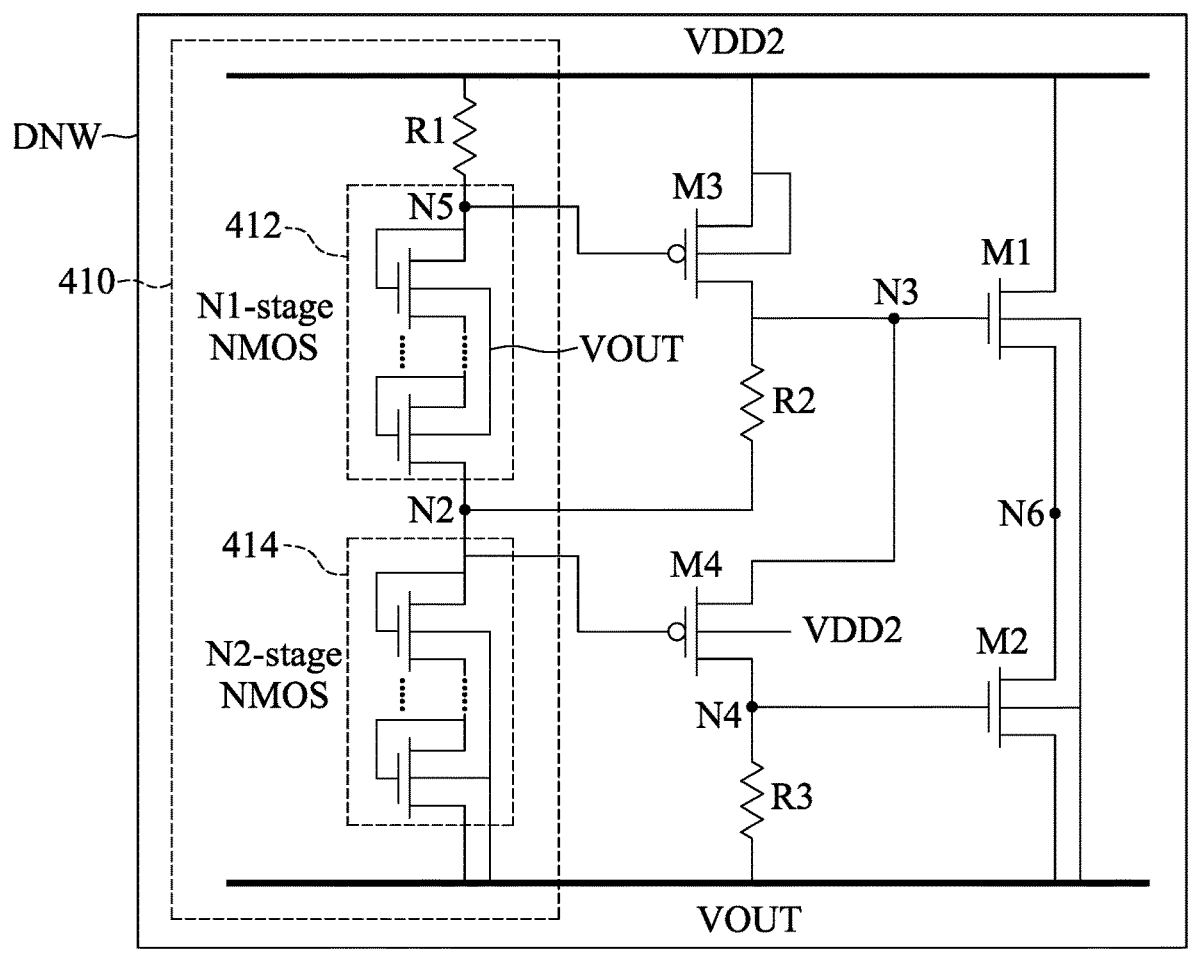
FIG. 4B is a diagram illustrating the ESD clamp circuit 400 implemented within a deep N-well in accordance with the embodiment of FIG. 4A.
Figure 4C:
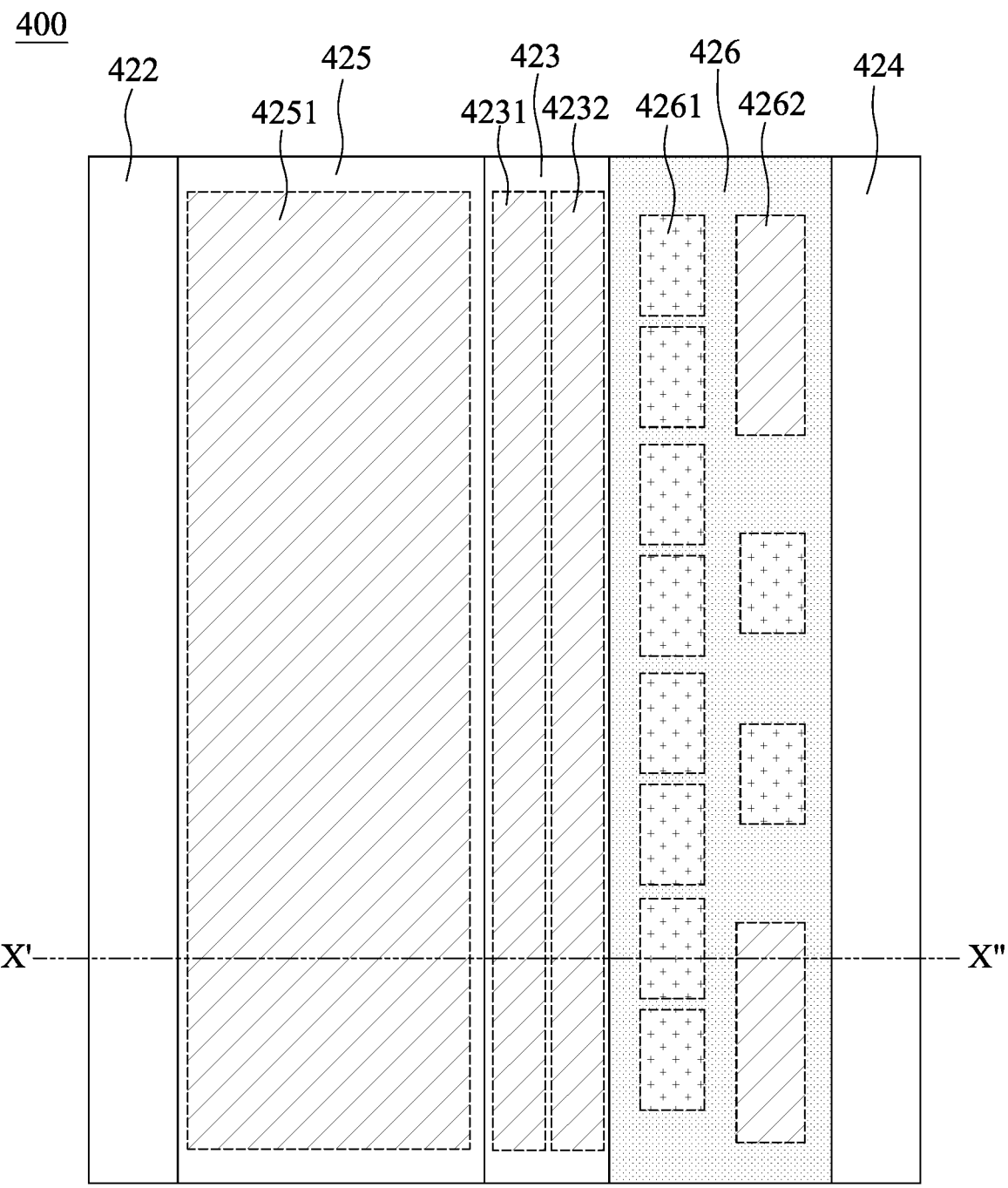
FIG. 4C is a top view of a layout diagram of the ESD clamp circuit 400 in accordance with the embodiment of FIG. 4A.
Figure 4D:
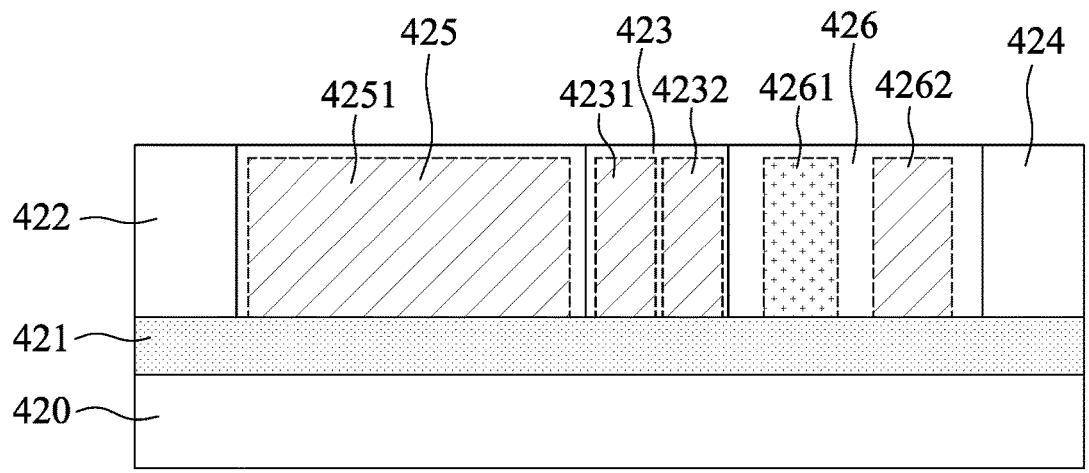
FIG. 4D is a cross section of the ESD clamp circuit 400 along line X'X" in accordance with the embodiment of FIG. 4C.

FIG. 4A is a schematic diagram of an ESD clamp circuit 400 in accordance with an embodiment of the present disclosure. FIG. 4B is a diagram illustrating the ESD clamp circuit 400 implemented within a deep N-well in accordance with the embodiment of FIG. 4A. FIG. 4C is a top view of a layout diagram of the ESD clamp circuit 400 in accordance with the embodiment of FIG. 4A. FIG. 4D is a cross section of the ESD clamp circuit 400 along line X'X" in accordance with the embodiment of FIG. 4C. Please refer to FIG. 3A and FIGS. 4A-4D.

In some embodiments, the ESD clamp circuit 306 in FIG. 3A may be replaced by the ESD clamp circuit 400. As depicted in FIG. 4A, the ESD clamp circuit 400 may include a voltage divider 410, transistors M1-M4, and resistors R2-R3. The voltage divider 410 may include a first transistor stage 412, a second transistor stage 414 and a resistor R1. The resistor R1, the first transistor stage 412, and the second transistor stage 414 may be connected in series. For example, the resistor R1 may be coupled between node N5 and the second power supply voltage VDD2. The first transistor stage 412 may be coupled between node N5 and node N2. The second transistor stage 414 may be coupled between node N2 and the output voltage VOUT. In some embodiments, the resistance of the resistor R1 may be within the range between 100 ohms and 1M ohms.

Specifically, there may be N1 transistors in the first transistor stage 412, and each of the transistors therein may be a diode-connected N-type transistor. Thus, the first transistor stage 412 can be regarded as a circuit having N1 resistors connected in series. The body of each transistors in the first transistor stage 412 may be connected to the output voltage VOUT. In addition, there may be N2 transistors in the second transistor stage 414, and each of the transistors therein may be a diode-connected N-type transistor. Thus, the second transistor stage 414 can be regarded as a circuit having N2 resistors connected in series. The body of each transistors in the second transistor stage 414 may be connected to the output voltage VOUT. In some embodiments, the numbers N1 and N2 may be positive integers (i.e., at least equal to 1). In some embodiments, the numbers N1 and N2 may be different. It should be noted that the numbers N1 and N2 can be adjusted according to practical needs.

In some embodiments, the transistors M1 and M2 may be BigFETs that function as a discharge circuit. The transistor M3 plus the resistor R2, and the transistor M4 and the resistor R3 may form a cascoded inverter.

When the semiconductor device 300 is in a normal operation mode, the voltage divider 410 may provide a bias voltage Vbias at node N2, and the bias voltage Vbias is provided to the gate of the transistor M1. At this time, since the gate and the source of the transistor M2 are provided with the bias voltage, the transistor M2 is turned off (i.e., |VGS_M2|=0V). When noises occur on the power rails of the output voltage VOUT and the second power supply voltage VDD2, the transistors M1 and M2 may not be triggered depending on the number of diode-connected NMOSs in the first transistor stage 412 and the second transistor stage 414. In some embodiments, when 6 stages are used in the first transistor stage 412 and the second transistor stage 414, noises no greater than 2V amplitude will not trigger the transistors M1 and M2. In addition, more stages are used in the first transistor stage 412 and the second transistor stage 414, the ESD clamp circuit 400 may be immune to noises having a greater amplitude variations. Specifically, in comparison to the RC controlled mechanism used in the ESD clamp circuit 306 shown in FIG. 3B, the voltage triggering mechanism for the transistors M1 and M2 (i.e., BigFETs) used by the ESD clamp circuit 400 in FIG. 4A may be immune to noises with known amplitude variations. In other words, the transistors M1 and M2 (i.e., BigFETs) will not be erroneously turned on due to the noises, thereby prevent the ESD clamp circuit 400 from high power loss caused by redundant ESD discharge current.

When the semiconductor device 300 is in the ESD mode, if an ESD event occurs on the power rail of the second power supply voltage, the gate voltage may be lower than the source voltage of the transistor M3, and thus the transistor M3 is turned on. The ESD spike voltage may be provided to node N3, and the gate voltage may be lower than the source voltage of the transistor M4, and thus the transistor M4 is also turned on. At this time, the voltage levels at node N3 and N4 may be sufficient to turn on the transistors M1 and M2 (i.e., BigFETs) to discharge the ESD current caused by the ESD event through the transistors M1 and M2.

In some embodiments, the resistor R2 may be replaced by an N-type transistor with diode-connected configuration, and the resistor R3 may be replaced by another N-type transistor with diode-connected configuration.

In some embodiments, the elements/devices in FIG. 4A may be fabricated in a deep N-well (DNW), as shown in FIG. 4B. The top view of the layout diagram of the ESD clamp circuit 400 is shown in FIG. 4C. In addition, a cross section of the ESD clamp circuit 400 along line X'X" in FIG. 4C is shown in FIG. 4D.

As depicted in FIG. 4D, the ESD clamp circuit 400 may include a substrate 420, and a deep N-well (DNW) 421 may be formed on top of the substrate 420. The substrate 420 may be or comprise a semiconductor wafer such as a silicon wafer. Alternatively, the substrate 420 may include other elementary semiconductors such as germanium. The substrate 420 may also include a compound semiconductor such as silicon carbide, gallium arsenic, indium arsenide, and indium phosphide. The substrate 420 may include an alloy semiconductor such as silicon germanium, silicon germanium carbide, gallium arsenic phosphide, and gallium indium phosphide. In present embodiment, the substrate 420 includes a P-type silicon wafer, which may be regarded as a P-type substrate.

In some embodiments, a plurality of well regions 422, 423, and 424 may be formed on top of the deep N-well 421 as sidewalls to define regions 425 and 426. The transistors M1 and M2 may be formed in the region 425. Since the transistors M1 and M2 are BigFETs, the active region of the transistors M1 and M2 may occupy almost the entire region 425, and the region 425 may be larger than region 426. The transistors M3 and M4 may be formed in regions 4231 and 4232 of the well region 423, respectively. The resistors R1-R3 may be formed in sub-regions 4261 of the region 426. In addition, the first transistor stage 412 and the second transistor stage 414 may be formed in sub-regions 4262 of the region 426.

Figure 5:
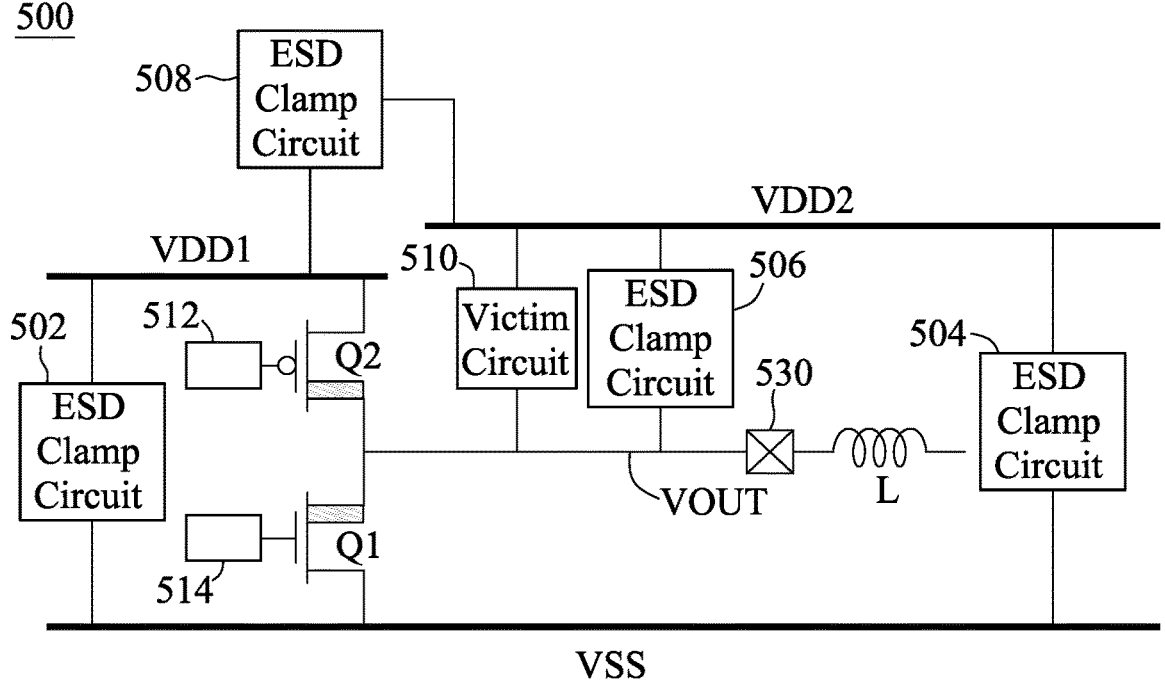
FIG. 5 is a schematic diagram of a semiconductor device 500 in accordance with another embodiment of the present disclosure.

FIG. 5 is a schematic diagram of a semiconductor device 500 in accordance with another embodiment of the present disclosure.

The semiconductor device 500 in FIG. 5 may be similar to the semiconductor device 300 in FIG. 3A, with the difference therebetween that an ESD clamp circuit 508 is disposed between the first power supply voltage VDD1 and the second power supply voltage VDD2. The ESD clamp circuit 508 may be similar to the ESD clamp circuit 400 shown in FIG. 4A. Specifically, with the design of the semiconductor device 500, every two different voltage domains used by the semiconductor device 500 may have a respective ESD clamp circuit disposed therebetween to protect the victim circuit 510 from damages caused by ESD events so as to achieve full-chip ESD protection.

In an embodiment, the present disclosure provides a semiconductor device. The semiconductor device includes a voltage divider, a cascoded inverter, and a discharge circuit. The voltage divider is electrically coupled between a power supply voltage and an output voltage of the semiconductor device. The cascoded inverter is electrically coupled to the voltage divider. The discharge circuit is electrically coupled to the cascoded inverter. The cascoded inverter is configured to turn on the discharge circuit to discharge an electrostatic discharge (ESD) current in response to an ESD event occurring on the power supply voltage or the output voltage when the semiconductor device is in an ESD mode.

In another embodiment, the present disclosure provides a semiconductor device, which includes a substrate, a deep N-well region, and a plurality of N-well regions. The deep N-well region is formed on the substrate. The plurality of N-well regions are formed on the deep N-well region as sidewalls to separate a first region and a second region. The first region includes: a voltage divider formed therein, and electrically coupled between a power supply voltage and an output voltage of the semiconductor device. The second region includes a cascoded inverter formed therein, and electrically coupled to the voltage divider. A first N-well region among the plurality of the N-well regions includes: a first transistor and a second transistor connected in series, and configured to discharge an electrostatic discharge (ESD) current in response to an ESD event occurring on the power supply voltage or the output voltage.

In yet another embodiment, the present disclosure provides an electrostatic discharge (ESD) clamp circuit, which includes a voltage divider, a first first-type transistor, a second first-type transistor, a first second-type transistor, and a second second-type transistor. The voltage divider includes: a first resistor, coupled between a power supply voltage and a first node; a first transistor stage, coupled between the first node and a second node; and a second transistor stage, coupled between the second node and an output voltage of a semiconductor device. The first first-type transistor has a gate coupled to the first node, a source coupled to the power supply voltage, and a drain coupled to a third node. The second first-type transistor has a gate coupled to the second node, a source coupled to the third node, and a drain coupled to a fourth node. The first second-type transistor has a gate coupled to the third node, a source coupled to a fifth node, and a drain coupled to the power supply voltage. The second second-type transistor has a gate coupled to the fourth node, a source coupled to the output voltage, and a drain coupled to the fifth node.

The methods and features of the present disclosure have been sufficiently described in the provided examples and descriptions. It should be understood that any modifications or changes without departing from the spirit of the present disclosure are intended to be covered in the protection scope of the present disclosure.

Moreover, the scope of the present application is not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, can be utilized according to the present disclosure.

Accordingly, the appended claims are intended to include within their scope processes, machines, manufacture, compositions of matter, means, methods or steps. In addition, each claim constitutes a separate embodiment, and the combination of various claims and embodiments are within the scope of the present disclosure.

What is claimed is:

1. A semiconductor device, comprising:
a voltage divider, electrically coupled between a first power rail of a power supply voltage and a second power rail of an output voltage of the semiconductor device;
a cascoded inverter, electrically coupled to the voltage divider; and
a discharge circuit, electrically coupled to the cascoded inverter,
wherein the cascoded inverter is configured to turn on the discharge circuit to discharge an electrostatic discharge (ESD) current in response to an ESD event occurring on the first power rail or the second power rail when the semiconductor device is in an ESD mode,
wherein the voltage divider comprises a first resistor, a first transistor stage, and a second transistor stage connected in series,
wherein the first resistor is coupled between the first power rail and a first node, and the first transistor stage is coupled between the first node and a second node, and the second transistor stage is coupled between the second node and the second power rail,
wherein the cascoded inverter comprises:
a first transistor, having a gate coupled to the first node, a source coupled to the first power rail, and a drain coupled to a third node;
a second transistor, having a gate coupled to the second node, a source coupled to the third node, and a drain coupled to a fourth node;
a second resistor, coupled between the second node and the third node; and
a third resistor, coupled between the fourth node and the second power rail.

2. The semiconductor device of claim 1, wherein the first transistor stage comprises N1 transistors, and the second transistor stage comprises N2 transistors, wherein N1 and N2 are positive integers.

3. The semiconductor device of claim 2, wherein N1 is different from N2.

4. The semiconductor device of claim 2, wherein the N1 transistors and the N2 transistors are in a diode-connected configuration.

5. The semiconductor device of claim 2, wherein the first transistor and the second transistor are P-type transistors.

6. The semiconductor device of claim 5, wherein each transistor within the first transistor stage and the second transistor stage is an N-type transistor.

7. The semiconductor device of claim 6, wherein a body of each transistor within the first transistor stage and the second transistor stage is electrically connected to the second power rail.

8. The semiconductor device of claim 1, wherein the output voltage is generated by a CMOS inverter based on a second power supply voltage.

9. The semiconductor device of claim 8, wherein a voltage difference between the power supply voltage and the output voltage is a substantially fixed voltage.

10. The semiconductor device of claim 1, wherein the second resistor and the third resistor are implemented using a third transistor and a fourth transistor, which are in a diode-connected configuration, respectively.

11. The semiconductor device of claim 10, wherein a size of the third transistor and the fourth transistor is larger than that of the first transistor and the second transistor.

12. The semiconductor device of claim 11, wherein when the semiconductor device is in a normal operation mode, the fourth transistor is turned off, and the discharge circuit is immune to noises occurring at the first power rail.

13. The semiconductor device of claim 1, wherein the discharge circuit comprises:
a third transistor, having a gate coupled to the third node, a source coupled to a fifth node, and a drain coupled to the first power rail; and
a fourth transistor, having gate coupled to the fourth node, a source coupled to the second power rail, and a drain coupled to the fifth node.

14. The semiconductor device of claim 1, wherein when the semiconductor device is in an ESD mode, the first transistor and the second transistor are turned on to turn on the discharge circuit to discharge the ESD current caused by an ESD event occurring on the first power rail.

15. The semiconductor device of claim 1, wherein a resistance of the first resistor is within a range between 100 ohms and 1M ohms.

16. A semiconductor device, comprising:
a substrate;
a deep N-well region, formed on the substrate; and
a plurality of N-well regions formed on the deep N-well region as sidewalls to separate a first region and a second region;
wherein the first region comprises:
a voltage divider formed therein, and electrically coupled between a first power rail of a power supply voltage and a second power rail of an output voltage of the semiconductor device;
wherein the second region comprises:
a cascoded inverter formed therein, and electrically coupled to the voltage divider;
wherein a first N-well region among the plurality of the N-well regions comprises:
a first transistor and a second transistor connected in series, and configured to discharge an electrostatic discharge (ESD) current in response to an ESD event occurring on the first power rail or the second power rail,
wherein the cascoded inverter comprises:
a third transistor, having a gate coupled to a first node, a source coupled to the first power rail, and a drain coupled to a second node;
a fourth transistor, having a gate coupled to a third node, a source coupled to the third node, and a drain coupled to a fourth node;
a first resistor, coupled between the second node and the third node; and
a second resistor, coupled between the fourth node and the second power rail.

17. The semiconductor device of claim 16, wherein the voltage divider comprises;
a third resistor, coupled between the first power rail and the first node;
a first transistor stage, coupled between the first node and the third node; and
a second transistor stage, coupled between the third node and the second power rail.

18. An electrostatic discharge (ESD) clamp circuit, comprising:
a voltage divider, comprising:
a first resistor, coupled between a first power rail of a power supply voltage and a first node;
a first transistor stage, coupled between the first node and a second node; and a second transistor stage, coupled between the second node and a second power rail of an output voltage of a semiconductor device;
a first first-type transistor, having a gate coupled to the first node, a source coupled to the first power rail, and a drain coupled to a third node;
a second first-type transistor, having a gate coupled to the second node, a source coupled to the third node, and a drain coupled to a fourth node;
a first second-type transistor, having a gate coupled to the third node, a source coupled to a fifth node, and a drain coupled to the first power rail; and
a second second-type transistor, having a gate coupled to the fourth node, a source coupled to the second power rail, and a drain coupled to the fifth node.

19. The ESD clamp circuit of claim 18, wherein the first first-type transistor and the second first-type transistor are P-type transistors, and the first second-type transistor and the second second-type transistor are N-type transistors.

20. The ESD clamp circuit of claim 19, wherein a width of the first second-type transistor and the second second-type transistor is greater than that of the first first-type transistor and the second first-type transistor.

* * * * *